United States Patent Office 3,008,982
Patented Nov. 14, 1961

3,008,982
FORMATION OF POLYCYCLIC DERIVATIVES OF CARBOXYLIC ACIDS
Louis Schmerling, Riverside, and Walter G. Toekelt, Downers Grove, Ill., assignors to Universal Oil Products Company, Des Plaines, Ill., a corporation of Delaware
No Drawing. Filed Mar. 13, 1959, Ser. No. 799,070
18 Claims. (Cl. 260—514)

This invention relates to a method for preparing polycyclic derivatives of organic compounds. More particularly the invention relates to a process for the preparation of bicyclic derivatives of alkali metal or alkaline earth metal salts of saturated carboxylic acids, and to polycyclic derivatives of the saturated carboxylic acids thereof.

Polycyclic derivatives of aliphatic carboxylic acids or the corresponding alkali metal and alkaline earth metal salts thereof which may be prepared according to the process of this invention may find many uses in the chemical field. For example, relatively high molecular weight organic acids containing a polycyclic substituent may be used as intermediates in the preparation of relatively high molecular weight organic esters, said esters in turn being used in the preparation of artificial perfumes and flavors. Furthermore, certain esters may also be used as solvents, especially in the manufacture of quick drying paints and lacquers. In addition, the alkali metal salts of these carboxylic acids containing the polycyclic substituent may be used in the preparation of soaps and cleansing agents.

It is therefore an object of this invention to provide a method for the formation of polycyclic derivatives of alkali metal and alkaline earth metal salts of saturated carboxylic acids, and a method for the formation of polycyclic derivatives of the acids thereof.

A further object of this invention is to provide a method for the formation of polycyclic derivatives of alkali metal and alkaline earth metal salts of saturated carboxylic acids, and a method for the formation of polycyclic derivatives of the corresponding acids thereof.

One embodiment of this invention resides in a process for the formation of a polycyclic derivative of a salt of a carboxylic acid which comprises reacting an unsaturated bicyclic compound with a compound selected from the group consisting of alkali metal salts and alkaline earth metal salts of saturated carboxylic acids, said acids being characterized by the presence of at least one hydrogen atom on an alpha carbon atom, in the presence of a catalyst selected from the group consisting of alkali metals, their hydrides, amides and organo-metallic derivatives, at a temperature in the range of from about 50° to about 300° C.

Another embodiment of the invention is found in a process for the formation of a polycyclic derivative of an alkali metal salt of a carboxylic acid which comprises reacting an unsaturated derivative of a norbornane with an alkali metal salt of a fatty acid, said acid being characterized by the presence of at least one hydrogen atom on an alpha carbon atom, in the presence of a catalyst selected from the group consisting of alkali metals, their hydrides, amides and organo-metallic derivatives, at a temperature in the range of from about 50° to about 300° C.

A further embodiment of the invention resides in a process for the formation of a polycyclic derivative of an alkali metal salt of an aliphatic carboxylic acid which comprises reacting 2,5-norbornadiene with an alkali metal salt of a fatty acid, said acid being characterized by the presence of at least 1 hydrogen atom on an alpha carbon atom in the presence of a catalyst selected from the group consisting of sodium, its hydride, amide and organo-metallic derivatives, at a temperature in the range of from about 50° to about 300° C.

Yet another embodiment of this invention resides in a process for the formation of a polycyclic derivative of an aliphatic carboxylic acid which comprises reacting an unsaturated bicyclic hydrocarbon with a compound selected from the group consisting of alkali metal salts and alkaline earth metal salts of aliphatic carboxylic acids, said acids being characterized by the presence of a catalyst selected from the group consisting of alkali metals, their hydrides, amides and organo-metallic derivatives, at a temperature in the range of from about 50° to about 300° C., and thereafter acidifying the resultant product.

Still another embodiment of the invention resides in a process for the formation of a polycyclic derivative of a carboxylic acid which comprises reacting a 2,5-norbornadiene with an alkali metal salt of a saturated carboxylic acid, said acid being characterized by the presence of at least one hydrogen atom on an alpha carbon atom, in the presence of a catalyst selected from the group consisting of sodium, its hydride, amide and organo-metallic derivatives, at a temperature in the range of from about 50° to about 300° C., and thereafter acidifying the resultant product.

A specific embodiment of the invention is found in a process for the formation of a polycyclic derivative of an alkali metal salt of a carboxylic acid which comprises reacting 2,5-norbornadiene with sodium acetate in the presence of sodamide at a temperature in the range of from about 150° to about 250° C.

Another specific embodiment of the invention resides in a process for the formation of a polycyclic derivative of an aliphatic carboxylic acid which comprises reacting 2-norbornene with sodium propionate in the presence of sodamide at a temperature in the range of from about 150° to about 250° C., and thereafter acidifying the resultant product.

Other objects and embodiments referring to alternative unsaturated bicyclic compounds, alternative alkali metal salts and alkaline earth metal salts of carboxylic acids, alternative catalysts will be found in the following further detailed description of the invention.

As hereinbefore stated this invention is concerned with the formation of polycyclic derivatives of alkali metal salts and alkaline earth metal salts of carboxylic acids and to the corresponding acids thereof. These salts and acids are prepared by reacting an unsaturated polycyclic compound and preferably an unsaturated derivative of norbornane having the generic formulae:

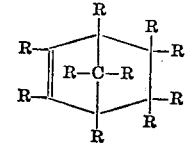

or

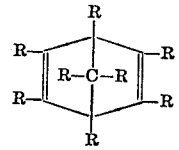

in which R is independently selected from the group consisting of hydrogen and alkyl radicals, said alkyl radicals containing from 1 to about 15 carbon atoms and preferably containing from 1 to about 4 carbon atoms, with either an alkali metal salt of a carboxylic acid or an alkaline earth metal salt of a carboxylic acid, said acid being characterized by the presence of at least one hydrogen atom on an alpha carbon atom, in the presence of certain catalysts hereinafter set forth to form the desired salt, and thereafter acidifying said salt if the corresponding acid is to be the final product.

Examples of the aforementioned unsaturated derivatives of norbornane which may be used in the process of this invention include the norbornenes such as 2-norbornene, methyl-2-norbornenes, ethyl-2-norbornenes, n-propyl-2-norbornenes, isopropyl-2-norbornenes, n-butyl-2-norbornenes, sec-butyl-2-norbornenes, isobutyl-2-norbornenes, t-butyl-2-norbornene, the isomeric pentyl, hexyl, heptyl, octyl, nonyl, decyl substituted 2-norbornenes, etc.; dimethyl-2-norbornenes, diethyl-2-norbornenes, di-n-propyl-2-norbornenes, di-isopropyl-2-norbornenes, di-n-butyl-2-norbornenes, di-sec-butylnorbornenes, di-iso-butyl-norbornenes, di-t-butyl-2-norbornenes, the isomeric dipentyl, dihexyl, diheptyl, dioctyl, dinonyl, didecyl, substituted 2-norbornenes, etc., the corresponding tri-substituted, tetra-substituted, penta-substituted, hexa-substituted, hepta-substituted, octa-substitued, nona-subsituted and deca-substituted derivatives of 2-norbornenes, etc.; the 2,5-norbornadienes such as 2,5-norbornadiene, methyl-2,5-norbornadienes, ethyl-2,5-norbornadienes, n-propyl-2,5-norbornadienes, isopropyl-2,5-norbornadienes, n-butyl-2,5-norbornadienes, sec-butyl-2,5-norbornadienes, t-butyl-2,5-norbornadienes, isobutyl-2,5-norbornadienes, the isomeric pentyl, hexyl, heptyl, octyl, nonyl, decyl substituted 2,5-norbornadienes, etc., dimethyl-2,5-norbornadienes, diethyl-2,5-norbornadienes, di-n-propyl-2,5-norbornadienes, di-isopropyl-2,5-norbornadienes, di-n-butyl-2,5-norbornadienes, di-sec-butyl-2,5-norbornadienes, di-isobutyl-2,5-norbornadienes, di-t-butyl-2,5-norbornadienes, the isomeric dipentyl, dihexyl, diheptyl, dioctyl, dinonyl, didecyl substituted 2,5-norbornadienes, etc., the corresponding tri-substituted, tetra-substituted, penta-substituted, hexa-substituted, hepta-substituted, and octa-substituted derivatives of 2,5-norbornadiene, etc. The preferred alkyl substituted 2-norbornene contains the alkyl substituent in the 5 position, such a compound being readily prepared from the condensation between cyclopentadiene and an olefin of the desired chain length. For example, 5-decyl-2-norbornene may readily be prepared by the reaction between cyclopentadiene and 1-dodecene. Also, the preferred positions for dialkyl substituted 2-norbornene is the 5 and 6 position in the ring, such dialkyl substituted norbornenes being readily available for reasons similar to that set forth above. It is also contemplated within the scope of this invention that dialkyl substituted norbornenes containing dissimilar alkyl substituents, for example, methylethyl-2-norbornenes, may be prepared by reacting a methylcyclopentadiene with the desired olefin, in this instance, 1-butene. In addition, 2,5-norbornadiene is the desired starting material when the unsaturated derivative of norbornane contains two olefinic linkages, inasmuch as said 2,5-norbornadiene is readily prepared by reacting acetylene with cyclopentadiene. If the desired norbornadiene contains alkyl substituents of the type hereinbefore set forth the starting materials for such a compound could comprise cyclopentadiene plus an alkylacetylene or an alkylcyclopentadiene plus acetylene. The unsaturation in the unsaturated bicyclic compounds is endo, not exo, to the rings.

Furthermore, it is also contemplated within the scope of this invention that other unsaturated polycyclic compounds may also be condensed with the alkali metal salt or alkaline earth metal salt of an aliphatic carboxylic acid, said compounds including terpenes such as 2-pinene, 3-pinene, 2-carene, 3-carene, 2-thujene, 3-thujene, etc., although not necessarily with equivalent results, The alkali metal salts or alkaline earth metal salts of saturated carboxylic acids which may be reacted with the olefinic compound hereinbefore set forth include those acids containing at least one hydrogen atom on a carbon atom alpha to a carboxy group, such a carbon atom being referred to as an α-carbon atom for the purposes of this specification and claims. Generic formulae which may be used to describe these acids are as follows:

$$R_2CHCOOM \text{ and } MOOCCHR(CR_2)_nCOOM$$
and
$$(R_2CHCOO)_2M' \text{ and } [OOCR(CR_2)_nCOO]_2M'$$

in which R is independently selected from the group consisting of hydrogen, alkyl, cycloalkyl and aryl radicals, M is an alkali metal, M' is an alkaline earth metal and $n$ is an integer of from 0 to about 10. Alkali metal salts or alkaline earth metal salts of acids falling within these generic formulae include (1) salts of the fatty acids such as sodium acetate, potassium acetate, lithium acetate, cesium acetate, rubidium acetate, calcium acetate, magnesium acetate, barium acetate, strontium acetate, sodium propionate, potassium propionate, lithium propionate, cesium propionate, rubidium propionate, calcium propionate, magnesium propionate, barium propionate, strontium propionate, sodium butyrate, potassium butyrate, lithium butyrate, cesium butyrate, rubidium butyrate, calcium butyrate, magnesium butyrate, barium butyrate, strontium butyrate, the aforementioned alkali metal and alkaline earth metal salts of valerates, hexanoates, heptanoates, octanoates, etc.; sodium cyclohexanecarboxylate, potassium cyclohexanecarboxylate, lithiumcyclohexanecarboxylate, cesium cyclohexanecarboxylate, magnesium cyclohexanecarboxylate, calcium cyclohexanecarboxylate, barium cyclohexanecarboxylate, strontium cyclohexanecarboxylate, sodium cyclohexylacetate, potassium cyclohexylacetate, lithium cyclohexylacetate, cesium cyclohexylacetate, magnesium cyclohexylacetate, calcium cyclohexylacetate, barium cyclohexylacetate, strontium cyclohexylacetate, sodium phenylacetate, potassium phenylacetate, lithium phenylacetate, rubidium phenylacetate, cesium phenylacetate, calcium phenylacetate, magnesium phenylacetate, barium phenylacetate, strontium phenylacetate, sodium 2- or 3-phenylpropionate, potassium 2- or 3-phenylpropionate, lithium 2- or 3-phenylpropionate, rubidium 2- or 3-phenylpropionate, cesium 2- or 3-phenylpropionate, calcium 2- or 3-phenylpropionate, magnesium 2- or 3-phenylpropionate, barium 2- or 3-phenylpropionate, strontium 2- or 3-phenylpropionate, the aforementioned alkali metal and alkaline earth metal salts of the phenylbutyrates, phenylvalerates, phenylhexanoates, etc.; and (2) salts of dicarboxylic acids such as sodium malonate, potassium malonate, lithium malonate, cesium malonate, rubidium malonate, calcium malonate, barium malonate, strontium malonate, sodium succinate, potassium succinate, lithium succinate, rubidium succinate, cesium succinate, calcium succinate, magnesium succinate, barium succinate, strontium succinate, sodium glutarate, potassium glutarate, lithium glutarate, rubidium glutarate, cesium glutarate, barium glutarate, calcium glutarate, strontium glutarate, the aforementioned alkali metal and alkaline earth metal adipates, pimelates, suberates, sebacates, etc. For purposes of this invention the aryl substituted monocarboxylic acids (as well as cycloalkyl substituted monocarboxylic acids) such as phenylacetic acid, 2- and 3-phenylpropionic acid, etc. (and cyclohexanecarboxylic acid, cyclohexylacetic acid, etc.) are considered as falling within the terms "saturated carboxylic acids" and "fatty acids." Due to the relatively greater availability and relatively lower cost as well as the greater yields which are obtained thereby the sodium and potassium salts of the aforementioned saturated carboxylic acids, particularly the monocarboxylic acids, are the preferred reactants of the present process.

Catalysts which are employed in the present process comprise the alkali metals, their hydrides, amides and organo-metallic derivatives, such catalysts including sodium, sodium hydride, sodamide, potassium, potassium hydride, potassium amide, lithium, lithium hydride, lithium amide, rubidium hydride, rubidium amide, cesium, cesium hydride, cesium amide, etc. Mixed hydrides such as lithium aluminum hydride and sodium borohydride may also be used. The catalysts may also comprise an α-alkali metal or α-alkaline earth metal derivative of an alkali metal or alkaline earth metal salt of a saturated carboxylic acid of the type hereinafter set forth, or a mixture of the derivative and one of the catalysts hereinbefore set forth. It is also contemplated within the scope of this invention that the alkali metal plus a promoter such as an aromatic hydrocarbon including benzene, toluene, anthracene, etc., or an organic halide such as chlorobenzene, etc., or the alkali metal alkyl or aryl such as pentylsodium or phenylpotassium, etc., may be used as catalysts for the present invention although not necessarily with equivalent results.

In addition, if so desired, the reaction may be effected in the presence of a substantially inert organic diluent such as saturated aliphatic hydrocarbons including pentane, hexane, heptane, octane, etc.; cyclic and alkyl substituted cyclic hydrocarbons such as cyclopentane, cylohexane, cycloheptane, etc., methylcyclopentane, methylcyclohexane, methylcycloheptane, etc.; aromatic hydrocarbons such as benzene, toluene, o-, m- and p-xylene, ethylbenzene, etc., may also be used but are usually less preferable inasmuch as they may not be completely inert under the reaction conditions. Tertiary alkyl and aryl amines such as tributylamine and N,N-dimethylaniline may also be employed as diluents as may alkyl and polyalkyl ethers such as dibutyl ether, bis-(ethoxyethyl)ether, etc.

It is also contemplated within the scope of this invention that the unsaturated bicyclic compound of the type hereinbefore set forth may also be reacted with alkali metal or alkaline earth metal salts of saturated carboxylic acids in which a hydrogen atom attached to an α-carbon atom is replaced by an alkali metal or alkaline earth metal atom, such compounds including sodium α-sodioacetate, potassium α-potassioacetate, lithium α-lithioacetate, rubidium α-rubidioacetate, cesium α-cesioacetate, calcium α-calcioacetate, magnesium α-magnesioacetate, barium α-barioacetate, strontium α-strontioacetate, the aforementioned alkali metal and alkaline earth metal organometallic derivatives of the alkali metal and alkaline earth metal salts of the propionates, butyrates, valerates, hexanoates, heptanoates, octanoates, etc.; cyclohexanecarboxylates such as sodium α-sodiocyclohexanecarboxylate, potassium α-potassiocyclohexanecarboxylate, cesium α-cesiocyclohexanecarboxylate, magnesium α-magnesiocyclohexanecarboxylate, sodium α-sodiocyclohexylacetate, sodium α-sodiophenylacetate, magnesium α-magnesiophenylacetate, potassium α-potassio-β-phenylpropionate, the aforementioned alkali metal and alkaline earth metal phenylbutyrates, phenylvalerates, phenylhexanoates, etc.; dicarboxylic acids in which one or both α-carbon atoms are attached to an alkali metal or alkaline earth metal including the mono-substituted compounds such as sodium sodiomalonate, potassium potassiomalonate, calcium calciomalonate, strontium strontiomalonate, etc., sodium α-sodiosuccinate, lithium α-lithiosuccinate, barium α-bariosuccinate, etc.; di-α,α'-substituted compounds such as sodium α,α'-disodiosuccinate, potassium α,α'-dipotassiosuccinate, calcium α,α'-discalciosuccinate, barium α,α'-dibariosuccinate, etc.; and the aforementioned alkali metal and alkaline earth metal gluterates, adipates, pimelates, suberates, sebacates, etc. It is to be understood that these compounds may be reacted with the unsaturated bicyclic compounds such as an unsaturated derivative of norbornane although not necessarily with equivalent results.

Generally speaking the reaction between the alkali metal salt of a saturated carboxylic acid or the alkaline earth metal salt of a saturated carboxylic acid, said acids being characterized by the presence of at least one hydrogen atom on an α-carbon atom, and the unsaturated derivative of norbornane in the presence of a catalyst of the type hereinbefore set forth, is effected at a temperature in the range of from about 50° to about 300° C., and preferably at a temperature in the range of from about 150° to about 250° C., the particular temperature being dependent upon the reactants and the catalyst which are used. In addition the reaction may be carried out at an elevated pressure, in the range of from about 5 to about 200 atmospheres or more. This pressure may be the vapor pressure of the unsaturated norbornane derivative and the diluent, if used, or it may be supplied by the introduction of an inert gas such as nitrogen into the reaction vessel, said pressure being sufficient to maintain a substantial portion of the reactants in liquid form.

The process of this invention may be effected in any suitable manner and may comprise either a batch or a continuous type operation. For example, when a batch type operation is used a quantity of the alkali metal salt of a saturated carboxylic acid or the alkaline earth metal salt of a saturated carboxylic acid along with the unsaturated derivative of norbornene of the type hereinbefore set forth, along with the catalyst, and the diluent or solvent, if any is used, is sealed in a suitable apparatus such as, for example, a rotating autoclave. An inert gas may then be pressed in until the desired pressure has been reached. The reaction vessel is heated to the desired temperature and maintained thereat for a predetermined period of time after which the autoclave and contents thereof are cooled to room temperature, the excess pressure is vented and the reaction product is recovered by conventional means such as, for example, by dissolving the reaction product in water to hydrolyze any α-alkali metal or α-alkaline earth metal salt and form an alkaline solution of the desired salt of an aliphatic carboxylic acid. The aqueous solution may then be extracted with a suitable organic solvent such as ether to separate the diluent and to remove traces of alkali-insoluble material after which the resultant aqueous solution is concentrated and the desired salt is separated by fractional crystallization. Alternatively, if the polycyclic derivative of an aliphatic carboxylic acid is the desired product the resultant aqueous solution is acidified with a mineral acid, such as hydrochloric acid, sulfuric acid, phosphoric acid, etc., and then recovered by extraction (followed by fractional distillation) or by steam-distillation or by crystallization, if solid.

The reaction process of the present invention may also be effected in a continuous type manner. In this type of operation the starting materials comprising the alkali metal or alkaline earth metal salt of a saturated carboxylic acid and the unsaturated derivative of norbornane are continuously charged to a reaction zone which is maintained at the proper operating conditions of temperature and pressure and which contains the desired catalyst such as the alkali metal or amide or hydride thereof. The salt of the saturated carboxylic acid and the unsaturated norbornane derivative, in either liquid or gaseous form, are charged to the reactor through separate lines or, if so desired, may be admixed prior to entry into said reactor and charged thereto in a single stream. Likewise, the solvent or diluent, if one is used, is also continuously charged to the reactor through separate means or, may be admixed with one or the other of the starting materials and charged thereto in a single stream. The reaction zone may comprise an unpacked vessel or coil or may be lined with an adsorbent packing material such as alumina, dehydrated bauxite, fire brick and the like mixed with the catalyst. A particularly applicable form of continuous operation for this reaction comprises a fixed bed form in which the reactants pass over a fixed bed of the catalysts in either an upward or downward flow. Other forms of continuous types of operation which may be used include the moving bed type in which the reactants and the catalyst pass either concurrently or countercurrently to each other in moving beds, and the slurry type in which the catalyst is carried into the reaction zone as a slurry in one of the reactants.

After a predetermined residence time has elapsed the reaction product is continuously withdrawn from the reactor and separated from diluent and unreacted styrene by conventional means. The unreacted starting materials are recycled to form a portion of the feed stock while the reaction product is then continuously charged to a second reaction zone where said product undergoes hydrolysis by treatment with water which is also being continuously charged to said second reactor. The resulting product is continuously withdrawn from the second reaction zone and the desired polycyclic derivative of the salt of the saturated carboxylic acid is then separated by conventional means and recovered. If the polycyclic derivative of the saturated carboxylic acid itself is desired, the aforesaid product from the second reaction zone is then continuously charged to yet a third reaction zone where it is acidified by the addition of an acid of the type hereinbefore set forth. The product is continuously withdrawn from this third reaction zone and the desired derivative of the acid is recovered by conventional means, such as, for example, fractional distillation, fractional crystallization, etc. Alternatively, the hydrolysis and acidification can be carried out simultaneously in the second zone.

The following examples are given to illustrate the process of the present invention, which, however, are not intended to limit the generally broad scope of the present invention in strict accordance therewith.

*Example I*

A mixture of 30 g. of sodium sodioacetate and 50 g. of 2,5-norbornadiene was placed in the glass liner of a rotating autoclave having a capacity of 850 cc. The liner was sealed into the autoclave and nitrogen pressed in until an initial pressure of 30 atmospheres had been reached, said pressure being used to keep most of the 2,5-norbornadiene in the glass liner during the heating stage. The autoclave and contents thereof were then slowly heated to a temperature ranging from about 133° to about 250° C. for a period of about 4.5 hours. During this time the maximum pressure in the autoclave rose to about 70 atmospheres. At the end of the aforementioned period of time the autoclave and contents thereof were allowed to cool to room temperature, the final pressure at room temperature being 33 atmospheres. The excess pressure was vented, the autoclave was opened and 50 g. of solid product was recovered. This product was treated with ice water and the resulting product was extracted with ether to remove alkali-insoluble material which was present. The aqueous layer was then acidified with hydrochloric acid and extracted with ether. The ether extract was then subjected to fractional distillation under reduced pressure, a cut boiling chiefly at 118–119° C. at 1.4 mm. pressure being recovered; $n_D^{20}$=1.4953. The cut, which was a mixture of 5-norbornen-2-ylacetic acid and 3-nortricyclylacetic acid, was subjected to analysis with the following results:

Calcd. for $C_9H_{12}O_2$: C, 71.02; H, 7.95. Found: C, 71.19; H, 8.41.

*Example II*

In this example a mixture of 30 g. of sodium propionate, 10 g. of sodamide and 50 g. of 2,5-norbornadiene was placed in the glass liner of a rotating autoclave. The liner was sealed into the autoclave and nitrogen pressed in until an initial pressure of 50 atmospheres had been reached. The autoclave and contents thereof were then slowly heated at a temperature ranging from 56° to about 255° C. for a period of about 4.5 hours, the maximum pressure during this residence time reading 110 atmospheres. At the end of this time the autoclave and contents thereof were cooled to room temperature, the final pressure at room temperature being 52 atmospheres, the excess pressure was vented and the product comprising 68 g. of solid product inside the liner and 10 g. of product outside the liner was recovered. The reaction product was treated with ice water and extracted with ether to remove any alkali-insoluble material which may have been present. The aqueous layer was filtered, acidified with hydrochloric acid, extracted with ether and subjected to fractional distillation under reduced pressure. The desired mixture of 2-(5-norbornen-2-yl)-propionic acid and 2-(3-nortricyclyl)propionic acid boiling chiefly at 108–112° C. at about 1.0 mm. pressure was separated and recovered.

*Example III*

In this example 30 g. of sodium propionate, 50 g. of 2-norbornene and 15 g. of a high surface sodium catalyst (16% sodium composited on a precalcined, high surface area alumina support) were placed in the glass liner of a rotating autoclave. The liner was sealed into the autoclave and nitrogen pressed in until an initial pressure of 50 atmospheres had been reached. The autoclave and contents thereof were then heated at a temperature of from 96° to about 253° C. for a period of about 4.5 hours. During this time the maximum pressure in the autoclave reached 112 atmospheres. At the end of the aforementioned period of time the autoclave and contents thereof were allowed to cool to room temperature, the final pressure at room temperature being 58 atmospheres. The excess pressure was vented and the autoclave was opened, the reaction product comprising 79 g. being recovered therefrom. The product was added to alcohol and the resulting mixture was diluted with water to remove any alkali-insoluble material which may be present. This product was then filtered and the filtrate was extracted with ether. The aqueous layer was acidified with hydrochloric acid and again extracted with ether. Following this the extract was subjected to fractional distillation under reduced pressure, the cut boiling at 114–137° C. at 0.8 mm. pressure and consisting chiefly of 2-(2-norbornyl)propionic acid being separated and recovered.

*Example IV*

This experiment was carried out under conditions similar to those set forth in the above examples. In this experiment 30 g. of sodium propionate and 50 g. of 2,5-norbornadiene along with 15 g. of a solid catalyst comprising 16% metallic sodium composited on a precalcined, high surface area alumina support were placed in a glass liner of a rotating autoclave. The autoclave was sealed and nitrogen pressed in until an initial pressure of 50 atmospheres had been reached. The autoclave was then slowly heated at a temperature of from about 89° to about 254° C. for a period of about 4.5 hours, the maximum pressure reaching 98 atmospheres. At the end of this time the autoclave and contents thereof were allowed to cool to room temperature, the final pressure at room temperature being 48 atmospheres. The excess pressure was vented and the contents of the liner comprising 77 g. was withdrawn and treated with alcohol for a period of about 16 hours. Following this the mixture was diluted with water and filtered to remove any alkali-insoluble material which may be present. The filtrate was reduced in volume by evacuation and then extracted with ether to remove alkali-insoluble material which may be present. The aqueous layer was then acidified with hydrochloric acid and again extracted with ether. Following this the extract was subjected to fractional distillation and the cut boiling at 112–114° C. at 0.8 mm. pressure was separated and recovered.

*Example V*

A mixture of 30 g. of potassium butyrate, 15 g. of sodamide and 50 g. of 2-norbornene is treated in a manner similar to that set forth in the above examples. The desired reaction product is recovered from the liner of the autoclave, treated with water to remove any alkali-insoluble material present and extracted with ether. The filtrate is then acidified with hydrochloric acid and again extracted with ether, following which the ether extract is subjected to fractional distillation under reduced pressure from which the desired product 2-(2-norbornyl)butyric acid, is separated and recovered.

We claim as our invention:

1. A process for the formation of a polycyclic derivative of a salt of a carboxylic acid which comprises reacting an unsaturated alicyclic bicyclic hydrocarbon with a compound selected from the group consisting of alkali metal salts and alkaline earth metal salts of saturated carboxylic acids, said acids being characterized by the presence of at least one hydrogen atom on an alpha carbon atom, in the presence of a catalyst selected from the group consisting of alkali metals, their hydrides, amides and alkali metal alkyl and aryl, at a temperature in the range of from about 50° to about 300° C.

2. A process for the formation of a polycyclic derivative of an alkali metal salt of a carboxylic acid which comprises reacting an unsaturated hydrocarbon derivative of norbornane with a compound selected from the group consisting of alkali metal salts and alkaline earth metal salts of saturated carboxylic acids, said acids being characterized by the presence of at least one hydrogen atom on an alpha carbon atom, in the presence of a catalyst selected from the group consisting of alkali metals, their hydrides, amides and alkali metal alkyl and aryl, at a temperature in the range of from about 50° to about 300° C.

3. A process for the formation of a polycyclic derivative of an alkali metal salt of a carboxylic acid which comprises reacting an unsaturated alicyclic bicyclic hydrocarbon with an alkali metal salt of a fatty acid, said acid being characterized by the presence of at least one hydrogen atom on an alpha carbon atom, in the presence of a catalyst selected from the group consisting of alkali metals, their hydrides, amides and alkali metal alkyl and aryl, at a temperature in the range of from about 50° to about 300° C.

4. A process for the formation of a polycyclic derivative of an alkali metal salt of a carboxylic acid which comprises reacting a norbornene hydrocarbon with an alkali metal salt of a fatty acid, said acid being characterized by the presence of at least one hydrogen atom on an alpha carbon atom, in the presence of a catalyst selected from the group consisting of sodium, its hydride, amide and alkali metal alkyl and aryl, at a temperature in the range of from about 50° to about 300° C.

5. A process for the formation of a polycyclic derivative of an alkali metal salt of a carboxylic acid which comprises reacting a 2,5-norbornadiene hydrocarbon with an alkali metal salt of a fatty acid, said acid being characterized by the presence of at least one hydrogen atom on an alpha carbon atom, in the presence of a catalyst selected from the group consisting of sodium, its hydride, amide and alkali metal alkyl and aryl, at a temperature in the range of from about 50° to about 300° C.

6. A process for the formation of a polycyclic derivative of a sodium salt of a carboxylic acid which comprises reacting 2-norbornene with sodium acetate in the presence of sodamide at a temperature in the range of from about 150° to about 250° C.

7. A process for the formation of a polycyclic derivative of a sodium salt of a carboxylic acid which comprises reacting 2,5-norbornadiene with sodium acetate in the presence of sodamide at a temperature in the range of from about 150° to about 250° C.

8. A process for the formation of a polycyclic derivative of a sodium salt of a carboxylic acid which comprises reacting 2-norbornene with sodium propionate in the presence of sodium at a temperature in the range of from about 150° to about 250° C.

9. A process for the formation of a polycyclic derivative of a sodium salt of a carboxylic acid which comprises reacting 2,5-norbornadiene with sodium propionate in the presence of sodamide at a temperature in the range of from about 150° to about 250° C.

10. A process for the formation of a polycyclic derivative of a potassium salt of a carboxylic acid which comprises reacting 2-norbornene with potassium butyrate in the presence of sodamide at a temperature in the range of from about 150° to about 250° C.

11. A process for the formation of a polycyclic derivative of a salt of a carboxylic acid which comprises reacting an unsaturated bicyclic hydrocarbon selected from the group consisting of 2-norbornene hydrocarbons and 2,5-norbornadiene hydrocarbons with a compound selected from the group consisting of alkali metal salts and alkaline earth metal salts of saturated carboxylic acids having at least one hydrogen atom on an alpha carbon atom, in the presence of an alkali metal catalyst at a temperature of from about 50° to about 300° C.

12. The process of claim 11 further characterized in that said bicyclic hydrocarbon is 2-norbornene.

13. The process of claim 11 further characterized in that said bicyclic hydrocarbon is 2,5-norbornadiene.

14. The process of claim 11 further characterized in that said catalyst is metallic sodium.

15. The process of claim 11 further characterized in that said catalyst is sodamide.

16. A process for the formation of a polycyclic derivative of a carboxylic acid which comprises reacting an unsaturated alicyclic bicyclic hydrocarbon with a compound selected from the group consisting of alkali metal salts and alkaline earth metal salts of aliphatic carboxylic acids, said acids being characterized by the presence of at least one hydrogen atom on an alpha carbon atom, in the presence of a catalyst selected from the group consisting of alkali metals, their hydrides, amides and alkali metal alkyl and aryl, at a temperature in the range of from about 50° to about 300° C., and thereafter acidifying the resultant product.

17. A process for the formation of 5-nonbornen-2-yl-acetic acid and 3-nortricyclylacetic acid which comprises reacting 2,5-norbornadiene with sodium acetate in the presence of sodamide at a temperature in the range of from about 150° to about 250° C., and thereafter acidifying the resultant product.

18. A process for the formation of 2-(2-norbornyl)-propionic acid which comprises reacting 2-norbornene with sodium propionate in the presence of sodium at a temperature in the range of from about 150° to about 250° C., and thereafter acidifying the resultant product.

References Cited in the file of this patent

UNITED STATES PATENTS

| | | |
|---|---|---|
| 2,730,548 | Bluestone et al. | Jan. 10, 1956 |
| 2,782,238 | Bluestone et al. | Feb. 19, 1957 |
| 2,820,035 | Scheffler et al. | Jan. 14, 1958 |